Patented Jan. 1, 1924.

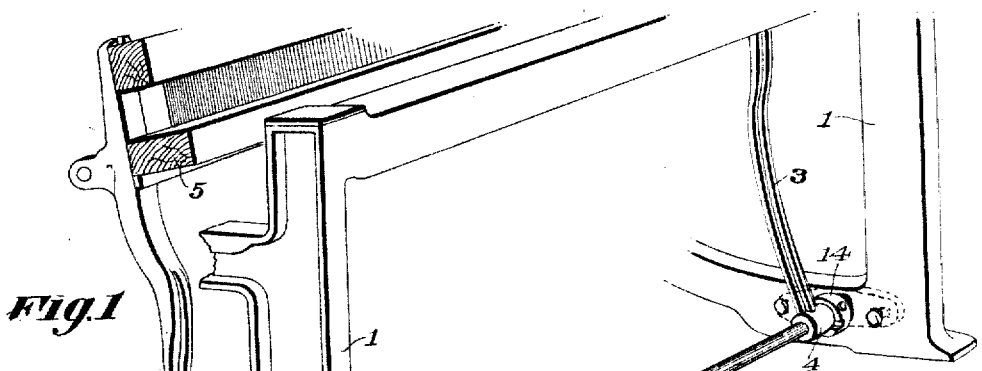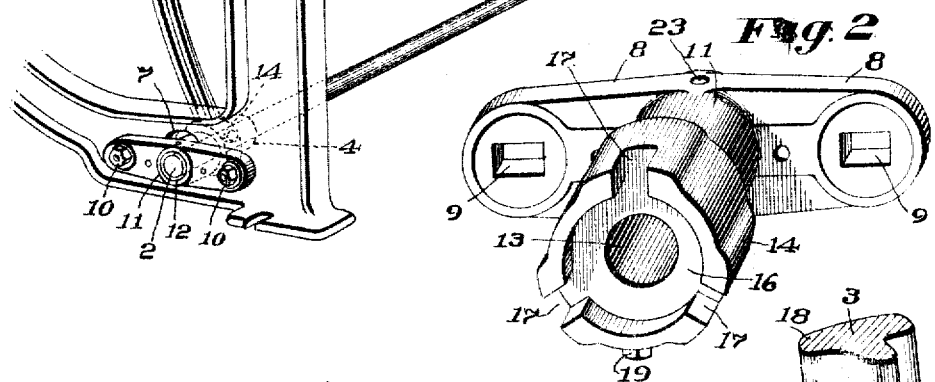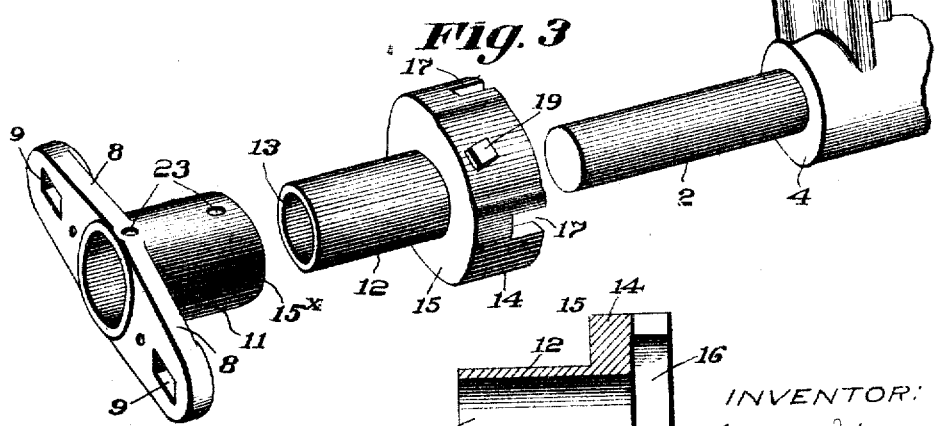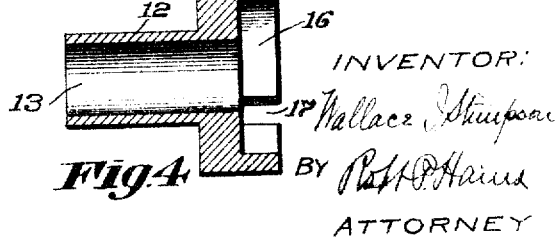

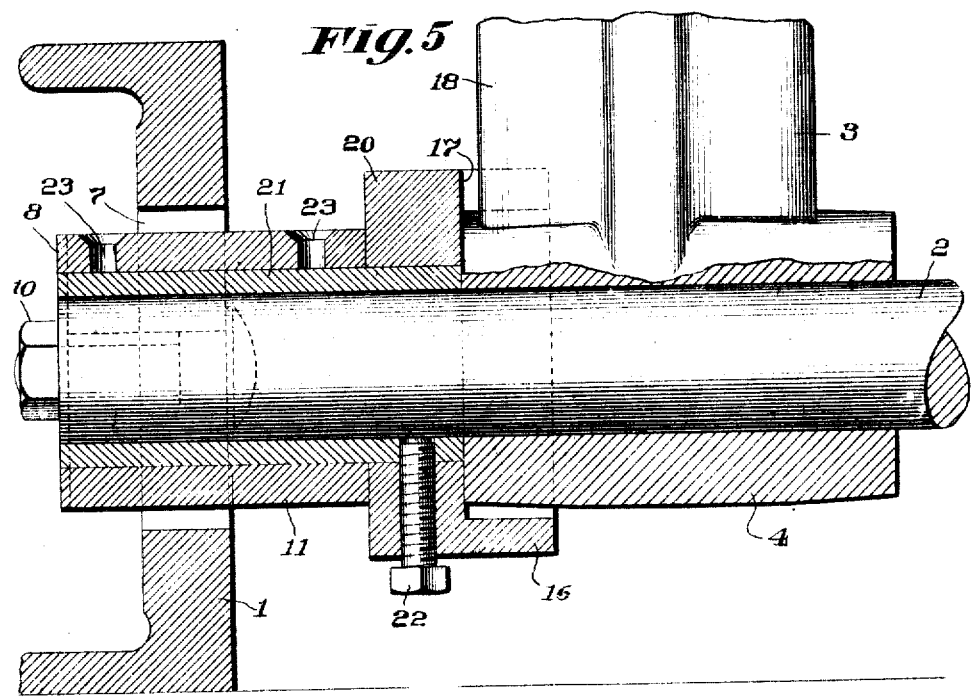
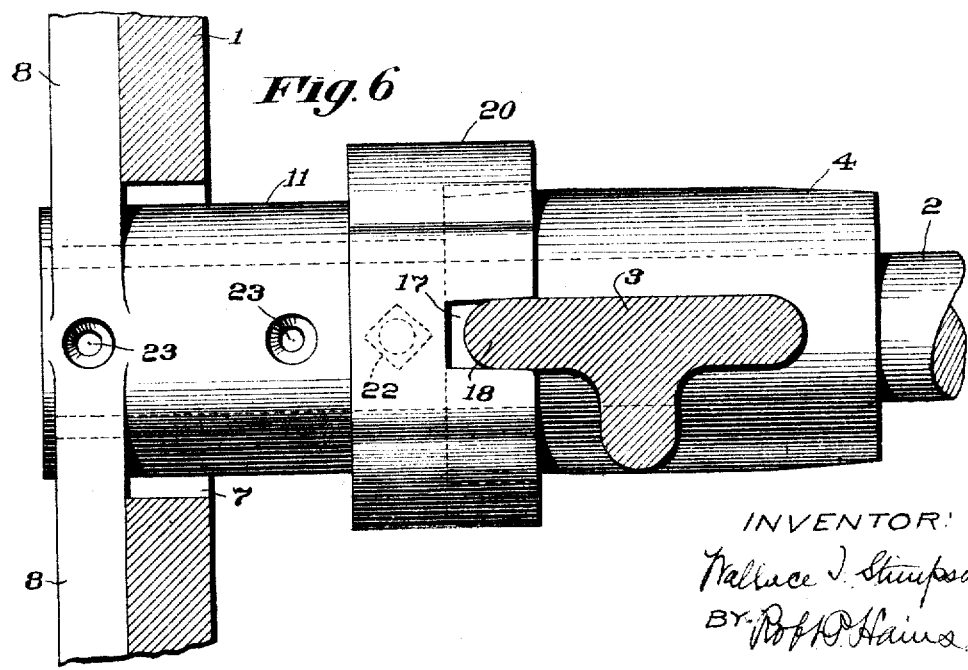

1,479,633

UNITED STATES PATENT OFFICE.

WALLACE I. STIMPSON, OF HOPEDALE, MASSACHUSETTS, ASSIGNOR TO DRAPER CORPORATION, OF HOPEDALE, MASSACHUSETTS, A CORPORATION OF MAINE.

LAY ROCK-SHAFT BEARING FOR LOOMS

Application filed December 6, 1922. Serial No. 605,188.

*To all whom it may concern:*

Be it known that I, WALLACE I. STIMPSON, a citizen of the United States, residing at Hopedale, in the county of Worcester and State of Massachusetts, have invented an Improvement in Lay Rock-Shaft Bearings for Looms, of which the following description, in connection with the accompanying drawings, is a specification, like characters on the drawings representing like parts.

This invention relates to looms and more particularly to the lay rock-shaft bearings.

The constant rocking movement of the lay rock-shaft during weaving produces wear and lost motion between the shaft and its bearings which in time admits objectionable play resulting in imperfect weaving. Heretofore various expedients have been suggested for overcoming the objections incident to the wear of the rock-shaft and its bearings, but the present invention differs from these in that in the broad sense its object is to relieve the lay rock-shaft itself from all wear and to transmit such wear to other parts readily and inexpensively renewable.

The present invention, among other advantages, provides a cheap and simple bearing which is susceptible of adjustment to present new wearing surfaces between the relatively movable parts and eliminate wear on the lay rock-shaft itself.

The invention will best be understood from the following description and accompanying drawings of one or two good practical forms thereof.

In the drawings:

Fig. 1 is a perspective view of a portion of a loom and the lay rock-shaft with the present invention associated therewith;

Fig. 2 is an enlarged perspective view of one good form of the present invention shown detached from the loom;

Fig. 3 is an enlarged perspective view showing the parts in separated relation but ready for assembly;

Fig. 4 is a section of the rocker-head and bushing;

Fig. 5 is an enlarged section, showing a slightly modified form of the invention; and Fig. 6 is a top plan view of the construction shown in Fig. 5 with the lay sword shown in section.

The loom frame 1, Fig. 1, may be of any usual construction and as shown the lay rock-shaft 2 is supported near the lower portion of the side frames of the loom in rocking movement. Secured to the lay rock-shaft 2 are the lay swords 3 which are usually designed with a hub portion 4 which is secured to the lay rock-shaft. The upper portions of the lay swords 3 support the usual lay 5 which is actuated, as usual, from the crank-shaft or other going part of the loom, the construction being such that as the lay is actuated during weaving the lay swords and the lay rock-shaft move with it, the latter being caused to rock.

It is usual in loom constructions to extend the rock-shaft 2 beyond the side frames of the loom in order to support the rocking shoe usually employed in connection with the picking mechanism, but for clearness of illustration of the present invention, these details are not herein shown.

Each of the side frames of the loom is provided with an opening 7 as usual and, as shown in the present instance, a box plate 8 having elongated openings 9 is adjustably secured, preferably to the outside of the side frame of the loom, by bolts 10. The box plate 8 has extending inwardly therefrom a sleeve or bearing 11, Fig. 3, preferably elongated, as shown, and the sleeve or bearing 11 extends through the opening 7 of the side frame of the loom inwardly thereof.

In accordance with the present invention there is interposed between the lay rock-shaft 2 and the sleeve or bearing 11 of the box plate a bushing which is secured to the lay rock-shaft and rocks with it between the lay rock-shaft and the inner surface of the sleeve or bearing 11. In the present invention, as indicated in Fig. 3, the bushing 12 has an opening 13 for the reception of the lay rock-shaft 2, and secured to the bushing is the rocker-head 14 which, when the parts are in assembled relation as indicated in Fig. 1, has its face 15 closely adjacent to or in contact with the face portion 15* of the sleeve or bearing 11.

The rocker-head 14 has its inner face recessed, as at 16, to receive the hub portion 4 of the associated lay sword and the peripherial portion of the rocker-head is provided with a series of notches or openings 17, three being shown in the present instance of the invention.

The lay sword 3, as indicated in Fig. 3, has a side projecting portion 18 and the notches 17 of the rocker-head are shaped and formed to receive into any one of the notches the side extending portion 18 of the lay sword.

In accordance with the present invention, the rocker-head 14 and its connected bushing 12 are associated with the lay rock-shaft 2 in fixed relation thereto so that as the lay rock-shaft is rocked, as hereinbefore described, so also will be the rocker-head and bushing.

It may be desirable in some cases to secure the rocker-head and bushing to the lay rock-shaft by a set screw 19, Fig. 3, but to insure that the parts are properly adjusted relatively about the lay rock-shaft to present new wearing portions, as will presently appear, it is desirable that the rocker-head be provided with means such as the notches 17 to insure the new adjusted relation of the parts.

When the parts are assembled, as indicated in Fig. 1, the box plate 8 is secured preferably to the outside of the loom frame with the sleeve or bearing 11 projecting inwardly to the inside of the frame, and the rocker-head 14 and bushing 12 are mounted upon the lay rock-shaft 2 and secured thereto for rotative or rocking movement therewith. To this end one of the notches 17 of the rocker-head is engaged with the side projecting portion 18 of the adjacent lay sword so that as the lay sword moves back and forth during weaving, the rocker-head and with it the bushing 12 which finds bearing in the sleeve or bearing 11, move with it. As a further means of insuring such movement and holding the parts in associated relation, the set screw 19 may in some instances be employed.

The construction and relation of the parts is such that all wear is taken off of the lay rock-shaft 2 and occurs between the bushing 12 and the sleeve or bearing 11. The sleeve 11 and bushing 12 preferably are formed of such relative hardness and of such materials that any wear between these parts during the rocking movement of the lay rock-shaft will be exerted on the sleeve 12. When the sleeve 12 has become worn so as to materially alter the path of lay movement, it is only necessary to back off the box plate 8 to permit disengagement of the rocker-head notch 17 from the lay sword flange or projection 18 and then turn the rocker-head and bushing 12 which is secured thereto, to present a new bearing portion between the bushing 12 and the sleeve or bearing 11, and reengage one of the other notches 17 with the flange 18 of the associated lay sword. Of course if the set screw 19 is also employed, this will be appropriately manipulated when the rocker-head and bushing have been turned to their new position and a fresh notch 17 of the head engaged with the lay sword. The box plate 8 may then be set up and weaving continued with accuracy.

The rocker-head 14 as shown is provided with three notches 17 but any appropriate number may be employed, and when the bushing 12 has become worn in its different portions to an objectionable degree, a new bushing and rocker-head may be substituted for the old one.

In the form of the invention as disclosed by Figs. 2, 3 and 4, the bushing 12 is made integral with the rocker-head 14, and such construction is cheap and easily manufactured by casting or otherwise.

In some cases, however, it may be desirable to form the bushing 12 and the rocker-head 14 separately, so that when the bushing itself becomes worn in its several portions, it may be detached from the associated rocker-head and a new bushing substituted therefor.

This modified form of construction is indicated in Figs. 5 and 6 wherein the rocker-head 20 is made separate from the bushing 21 and the bushing and head are secured together by detachable means such as the bolt 22. In all other respects, however, the parts are as described for the form of the invention indicated in Figs. 2, 3 and 4.

It is sometimes desirable to provide lubricating means between the bushing 12 or 21 and the sleeve or bearing 11, and these may be conveniently provided by holes 23, as more clearly indicated in Figs. 5 and 6.

What is claimed is:

1. In a loom, the combination of the lay rock-shaft, lay swords having hubs secured to the lay rock-shaft, a rocker head having a bushing mounted on the lay rock-shaft and provided with a recessed face for receiving the hub of a lay sword and with a plurality of notches constructed and arranged to engage the lay sword and hold the rocker head and bushing in adjusted position on the lay rock-shaft, and a holding plate having a sleeve into which the bushing extends.

2. In a loom, the combination of the lay rock-shaft, lay swords secured to the lay rock-shaft, a rocker-head having a bushing mounted on the lay rock-shaft, means for securing the rocker-head and bushing to the lay rock-shaft in different rotative positions that the rocker-head and bushing may rock with the lay rock-shaft, and a plate secured to the loom frame and having a bearing box into which the bushing extends.

3. In a loom, the combination of the lay rock-shaft, lay swords having hub portions secured to the lay rock-shaft, a bearing sleeve secured to the loom side and extending towards the hub of the adjacent lay sword, a rocker head interposed between the end of the bearing sleeve and the hub of the adjacent lay sword and having a bushing extending from the rocker head into the sleeve bearing, and means for securing the bushing to the lay rock-shaft in different rotative positions relative thereto.

4. In a loom, the combination of the lay rock-shaft, lay swords having hub portions secured to the lay rock-shaft inside the side frames of the loom, a bearing sleeve secured to the outer portion of the loom frame and extending inwardly towards the hub of the adjacent lay sword, a bushing mounted on the lay rock-shaft, means for securing it to the lay rock-shaft in different rotative positions of adjustment and for rocking movement therewith, said bushing being extended into the bearing sleeve and confined from endwise movement between bearing sleeve and the hub of the adjacent lay sword.

5. In a loom, the combination of the lay rock-shaft, lay swords secured thereto, a box-holding plate secured to the loom frame and having a box-bearing extending therefrom, a rocker-head having a detachable bushing for the reception of the rock-shaft and extending into the box-bearing of the box-holding plate, means for securing the rocker head and bushing to the lay rock-shaft to rock therewith that any wear due to rock-shaft movement may take place between the bushing and the box-bearing.

In testimony whereof, I have signed my name to this specification.

WALLACE I. STIMPSON.